No. 611,488. Patented Sept. 27, 1898.
G. KATZENSTEIN.
FILTER.
(Application filed Nov. 15, 1897.)
(No Model.) 2 Sheets—Sheet 1.
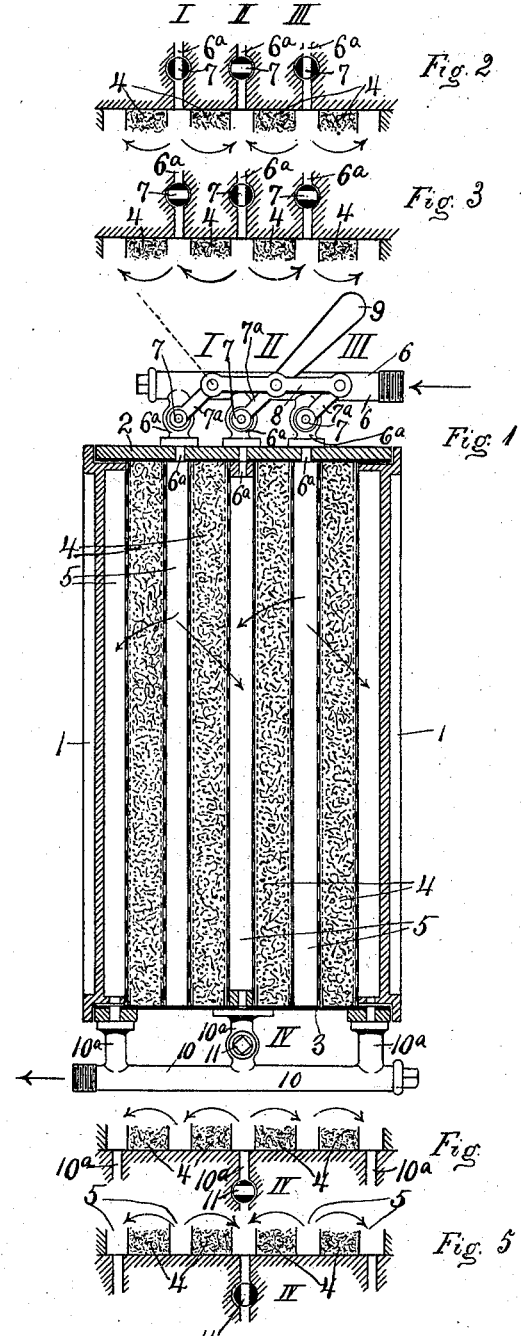

No. 611,488. Patented Sept. 27, 1898.
G. KATZENSTEIN.
FILTER.
(Application filed Nov. 15, 1897.)

(No Model.) 2 Sheets—Sheet 2.

Witnesses:
Edward K. Allen.
Herbert Bradley.

Inventor
Gustav Katzenstein
By Knight Bros
Attorneys

UNITED STATES PATENT OFFICE.

GUSTAV KATZENSTEIN, OF BERLIN, GERMANY.

FILTER.

SPECIFICATION forming part of Letters Patent No. 611,488, dated September 27, 1898.

Application filed November 15, 1897. Serial No. 658,599. (No model.)

*To all whom it may concern:*

Be it known that I, GUSTAV KATZENSTEIN, a subject of the Emperor of Germany, residing at Berlin, Germany, have invented certain new and useful Improvements in Filters, of which the following is a specification.

My invention relates generally to filters, but more particularly to the arrangement of the inlet and outlet valves thereof, whereby the water may be made to pass through one or more walls or columns of a filtering medium, as may be desired.

My invention consists of a suitable casing in which are located a number of filtering walls or columns having channels or passages between them for the water to flow through and a series of inlet-passages controlled by valves at one end of the casing and a series of outlet-passages at the other, only one of which is controlled by a valve. The inlet-valves are so arranged that the water may be made to flow into the casing and only pass through one filtering wall or column and then out of the casing into a discharge-pipe, or the water may be directed into the casing and caused to pass through two or more of the filtering walls or columns before it escapes from the casing.

In order that my invention may be fully understood, I will proceed to describe the same, with reference to the accompanying drawings, forming a part of this specification, in which—

Figure 6:
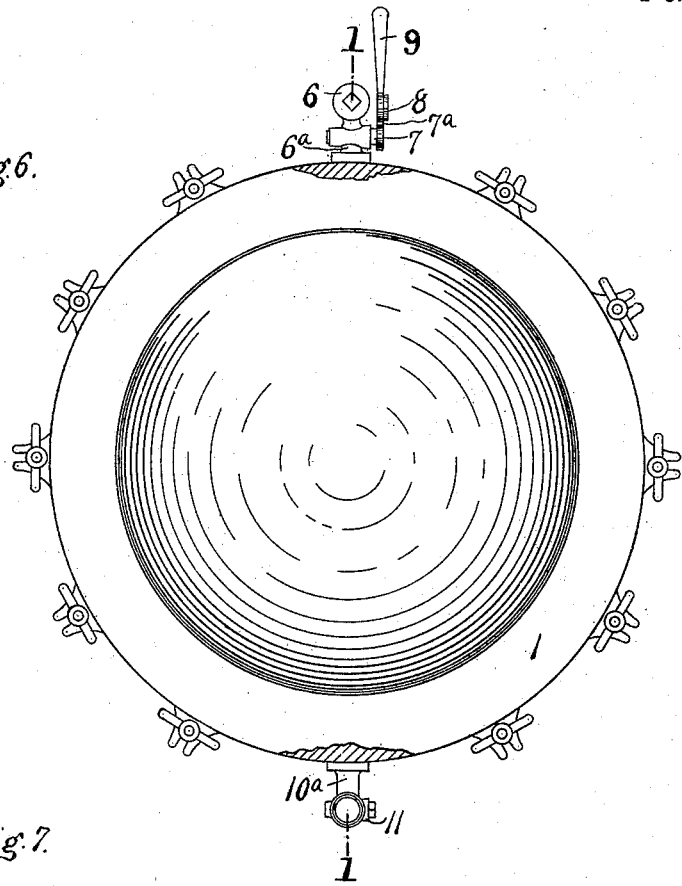
Figure 7:
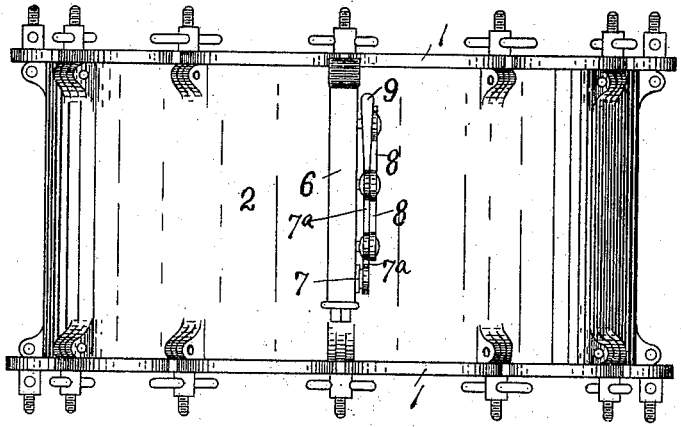

Figure 1 is an elevational view, partly in section, on the line 1 1, Fig. 6, to show the arrangement of the filtering columns or walls. Fig. 2 is a detail sectional view showing the position of the inlet-valves when it is desired to filter the water through a single column or wall of filtering medium. Fig. 3 is a view similar to Fig. 2, but showing the position of the valves when it is desired to filter through two or more walls or columns of the filtering medium. Fig. 4 is also a detail sectional view and showing the position of the single outlet-valve when the water is filtering through a single wall or column; and Fig. 5 is a view similar to Fig. 4, but showing the position of the single outlet-valve when the water is filtering through two or more of the walls or columns. Fig. 6 is a side elevation of the filter. Fig. 7 is a top view thereof.

In the said drawings, 1 represents the casing, and 2 the top and 3 the bottom thereof, both of which may be secured or attached to the casing in any preferred manner.

4 represents a number or series of filtering walls or columns located within the casing and arranged to have the channels or passages 5 between the walls or columns and the casing, through which the water passes. These walls or columns may be of any desired material and any number may be employed within the casing, as may be found convenient.

At one end of the casing I locate the supply-pipe 6, having a number of branch pipes $6^a$, which are connected to the end of the casing, so that the water from them will pass into the central channels or passages between the filtering walls or columns. In each of the branch pipes I locate a valve 7, having an operating-lever $7^a$, and the several levers are joined by a rod or pitman 8, so that when the operating-handle 9 is moved the several valves will be moved simultaneously. At the opposite end of the casing I locate a discharge-pipe 10, having branch pipes $10^a$, which are so arranged that two of them will be in communication with the passages formed by the outer wall of the casing and the adjacent wall or column of filtering medium, while the other branch pipe is in communication with one of the central passages. This last-mentioned pipe is the only one that is supplied with a controlling-valve 11, the purpose of which will be presently explained, the other branch pipes or passages being open.

The operation of the device is as follows: When it is desired to have the water filter through a single wall or column, the operating-handle is turned to the position shown in full lines in Fig. 1, in which position the valves are turned so that the water will be supplied through the end branch pipes and be shut off from the central branch pipe, as shown in Fig. 2. When this is the case, the water will flow as indicated by the arrows in Figs. 1 and 2 and escape through the three branch pipes connected with the discharge-pipe, as shown in Fig. 5, the single valve being opened to permit the water to escape through that passage. When, however, it is desired to have the water filter through two or more walls or columns of the filtering medium, the operating-handle is turned to the position shown by dotted lines, Fig. 1, in which position of the handle the valves are turned, as shown in Fig. 3, and the single valve in the branch discharge-pipe is turned to the position shown in Fig. 4, which prevents the water escaping through that passage. By this arrangement of the valves the water enters the casing through the central branch supply-pipe, and before it can escape from the casing it has to pass through all the filtering walls or columns, as shown by the arrows in Figs. 3 and 4, after which it passes out through the passages or channels next to the wall of the casing and out through the end branch pipes of the discharge-pipe.

From the foregoing it will be seen that I have provided a simple arrangement of filter and valves therefor by which the water can be filtered to a greater or less degree at any time during the operation of the filter, as may be found desirable.

Having thus described my invention, what I claim as new therein, and desire to secure by Letters Patent, is—

1. In a filter, the combination of a suitable casing, a number or series of filtering walls or columns arranged therein so as to form passages or channels between them and the outer wall of the casing, a supply-pipe having a series of branch pipes leading therefrom to the central passages of the casing, a discharge-pipe, branch pipes leading from the discharge-pipe to the casing, valves arranged in the branch pipes leading from the supply-pipe and a valve located in the central branch pipe leading from the discharge-pipe, and suitable means for operating said valves whereby the water may be made to pass through one or more of the filtering walls or columns; substantially as described.

2. In a filter, the combination of a suitable casing, a number or series of filtering walls or columns arranged therein so as to form passages or channels between them and the outer wall of the casing, a supply-pipe having a series of branch pipes leading therefrom to the central passages of the casing, valves located in said branch pipes, a discharge-pipe, branch pipes leading from the discharge-pipe to the casing, a valve located in the central branch pipe leading from the discharge-pipe, suitable means for simultaneously changing the position of the valves in the branch supply-pipes during the operation of the filter whereby the water may be made to pass through one or more of the filtering walls or columns, as desired, and means for operating the single valve in the central branch discharge-pipe; substantially as described.

The foregoing specification signed, at Berlin, this 26th day of October, 1897.

GUSTAV KATZENSTEIN.

In presence of—
WALDEMAR HAUPT,
HENRY HASPER.